United States Patent Office 3,275,570
Patented Sept. 27, 1966

3,275,570
LOWER VALENT TITANIUM-ALUMINUM HALIDES
Harry Julius Emeleus, Cambridge, and Derek Howden, Nunthorpe, England, assignors to British Titan Products Company Limited, Durham, England, a corporation of the United Kingdom
No Drawing. Filed July 8, 1963, Ser. No. 293,258
Claims priority, application Great Britain, July 13, 1962, 27,034/62
16 Claims. (Cl. 252—442)

The present invention relates to a process for the production of mixtures or compounds containing titanium having a valency lower than 4, and in particular to mixtures or compounds of this type wherein the titanium is present as a halide. The mixtures or compounds also contain an aluminium halide.

Lower halides of titanium in which the valency of titanium is less than 4, for example titanium trichloride, are commonly present together with an aluminium alkyl in polymerisation catalysts of the Ziegler/Natta-type, which are widely used in the polymerisation of unsaturated hydrocarbon compounds such as olefines, for example ethylene or propylene.

These compounds, i.e. the lower halides of titanium and halides of aluminium, are also of value as additives in the vapour phase oxidation of a titanium tetrahalide to produce pigmentary titanium dioxide, since they assist in the production of a product which is predominantly rutile.

The production of aluminium halides and lower halides of titanium by the reduction of a tetrahalide with aluminium has previously been described, particularly in relation to the production of Ziegler/Natta-type catalysts. Various methods of carrying out this reduction have been disclosed, for example:

(a) heating together aluminum and titanium tetrachloride at a temperature of about 200° C.;
(b) heating together aluminium and titanium tetrachloride in a liquid hydrocarbon at a temperature in the range of about 80° C. to 180° C. for long periods;
(c) ball milling aluminium and titanium tetrachloride together for prolonged periods at a temperature in the range of about 20° C. to 100° C.

These methods have the disadvantage that they are time-consuming and/or require special equipment.

It is an object of the present invention to provide a process for the production of mixtures or compounds containing a lower halide of titanium and an aluminium halide.

It is also an object of the invention to proivde such a mixture or compound which shows activity when used as a component of a Ziegler/Natta-type catalyst.

Accordingly, the present invention comprises reducing a titanium tetrahalide with aluminium in the presence of a compound having the formula $$AB_x$$

where A and B are different halogen atoms (but neither is a fluorine atom) and $x$ is an integer from 1 to 3 inclusive. The compound $AB_x$ is hereinafter referred to as the "interhalogen compound."

The prefered interhalogen compounds to be used in this invention are, however, those of the formula $AB_1$ and $AB_3$.

The titanium tetrahalide is preferably titanium tetrachloride and the interhalogen compound is preferably iodine monochloride. Other interhalogen compounds may be used, for example iodine trichloride.

It is preferred to carry out the process in a liquid diluent to provide a liquid reaction mixture.

The amount of tetrahalide used is preferably at least sufficient to react with all the aluminium present, i.e. at least a stoichiometric amount of the tetrahalide; indeed, it is advantageous to use an excess of the tetrahalide in order to ensure that no free aluminium remains in the reaction product, as this may be undesirable.

As mentioned above, the reaction preferably carried out in a liquid reaction mixture incorporating a liquid diluent, for example a liquid aromatic hydrocarbon such as benzene, toluene or xylene. In these circumstances the reaction may take place without heating, usually after a short induction period, but heat may be applied to the reaction mixture, if desired. If the reaction mixture is heated a generally convenient method of doing this is to boil the reaction mixture under reflux until the reaction starts.

Where the titanium tetrahalide is a liquid, as in the case of titanium tetrachloride, an excess of this may be used as the liquid diluent to provide a liquid reaction mixture.

Since the reaction is exothermic it is normally carried out under reflux to prevent loss of any tetrahalide and/or diluent as the reaction proceeds.

Where the reaction is carried out in the presence of an excess of titanium tetrahalide or other liquid diluent the violence of the reaction is decreased. The product is a slurry from which a brown or purple solid may be obtained, for example by filtration or distillation and by the drying of the residue.

Since the lower halides of titanium are reactive towards oxygen and moisture, the reaction and the recovery of the product are advantageously carried out in the absence of oxygen and moisture, for example under an atmosphere inert to the reaction mixture such as nitrogen or argon.

A convenient method of introducing the interhalogen compound into the reaction mixture is to dissolve it in the titanium tetrahalide or in a liquid diluent. This may be done, for example, by adding it to the titanium tetrahalide or diluent before adding this to the aluminium. Alternatively, the interhalogen compound may be added after mixing the aluminium and the titanium tetrahalide (and any additional diluent) in the reaction vessel.

It is preferred to use only sufficient of the interhalogen compound to initiate the reaction since an excess of this compound may reduce the yield of the lower titanium halide. A convenient amount of the interhalogen compound to be used is from 0.9 to 10 times, preferably from 1.5 to 4 times, the weight of aluminium used.

It is, of course, preferred that the aluminium be present in a finely-divided form to ensure the most rapid and complete reaction.

If it is desired to use the product of the reaction as a component of a Ziegler/Natta-type catalyst, the dry material may be recovered by known methods and used in a known manner as a catalyst component. For example, it may be milled, suitably by either dry ball milling or ball milling in a liquid vehicle. Where a liquid vehicle is used it is preferably the liquid in which the polymerisation process is to be carried out. After milling, the product may be introduced into a polymerisation vessel and the other component of the catalyst may then conveniently be introduced into the vessel followed by the unsaturated hydrocarbon that is to be polymerised. Such other component of the catalyst is suitably an organo-metallic compound such as aluminium alkyl or aluminium alkyl halide and in particular aluminium trialkyl or triaryl, for example triethyl aluminium, tri-n-propyl aluminium, tri-n-butyl aluminium or triphenyl aluminium. Alkyl or aryl compounds of other metals in Groups 1–3 of the Periodic Table may be used, if desired.

If it is desired to use the product of this invention in the vapour phase oxidation of a titanium tetrahalide, this may be done, for example, by reacting a calculated proportion of aluminium with an excess of titanium tetrahalide in the presence of the interhalogen compound and using the product as a feed or as an addition to the feed to the vapour phase oxidation reactor. Both the aluminium halide and the lower halide of titanium present in the mixture are rutile promoters.

The following examples describe methods of carrying out the process of the present invention.

*Example 1*

A flask fitted with a reflux condenser was filled with dry argon. To this flask were added 9 g. aluminium powder having a mean particle size of about 0.5 microns, followed by 121 ml. redistilled titanium tetrachloride, 200 ml. dry benzene and 8.12 g. iodine monochloride were then added to the aluminium powder.

After an induction period of approximately 1 hour at room temperature a violent exothermic reaction occurred. A brown slurry was obtained from which the solid was filtered off under argon, washed with benzene and dried under reduced pressure for 6 hours at 100° C. The product was a brown solid.

The catalytic activity of the solid was tested by ball milling some of it in dry heptane for 48 hours, and introducing an amount of the milled product equivalent to 8.9 millimoles titanium into a testing flask, followed by 17.8 millimoles triethyl aluminium. The temperature of the reaction mixture was maintained at 50° C. and propylene was passed through the mixture for 3 hours. At the end of this time 67 g. solid polypropylene were recovered.

The catalytic activity of the product was therefore 59.6 moles propylene/mole titanium/hour.

*Example 2*

The process described in Example 1 was repeated using 33 g. iodine monochloride. The induction period was reduced to 7 minutes and a brown solid was recovered.

The catalytic activity of the product was tested as in Example 1 using an amount of the product slurried in dry heptane equivalent to 10.4 millimoles titanium, and using 20.8 millimoles triethyl aluminium. Solid polypropylene (69.5 g.) was recovered. The mixture produced by the present invention therefore had a catalytic activity of 53 moles propylene/mole titanium/hour.

*Example 3*

The process described in Example 1 was repeated using an excess of titanium tetrachloride in place of benzene as a diluent. Aluminium (9 g.), titanium tetrachloride (330 mls.) and iodine monochloride (33 g.) were added to the flask. The induction period was approximately 1 hour and a purple solid was recovered from the reaction mixture.

The catalytic activity was estimated as described in Example 1 using sufficient of the product slurried in dry heptane to provide 10.5 millimoles titanium, and using 21.0 millimoles triethyl aluminium. Solid polypropylene (100.2 g.) was recovered giving a catalytic activity of 76 moles propylene/mole titanium/hour.

*Example 4*

The process described in Example 1 was repeated using 10 g. iodine trichloride in place of the iodine monochloride.

No obvious reaction took place immediately but after a period of 5 days the slurry had thickened and contained a brown solid. This was filtered off, washed with benzene and dried under reduced pressure.

The catalytic activity was tested as described in Example 1 using an amount of the product equivalent to 10.35 millimoles titanium and 20.7 millimoles triethyl aluminium. Solid propylene (97 g.) was recovered, indicating a catalytic activity of 74.4 moles propylene/mole titanium/hour.

What is claimed is:

1. In the reaction in a liquid reaction medium of a titanium tetrahalide and aluminium metal to produce a lower valent titanium-aluminium halide composition, the improvement comprising initiating said reaction in the reactive presence of an interhalogen compound having the formula $AB_x$ wherein A and B are different halogen atoms other than fluorine and $x$ is an integer from 1 to 3.

2. A process according to claim 1 in which the weight of the interhalogen compound is from 0.9 to 10 times the weight of the aluminium.

3. A process according to claim 2 in which the weight of the interhalogen compound is from 1.5 to 4 times the weight of the aluminium.

4. A process according to claim 1 in which the tetrahalide is liquid and an excess of it is used to maintain a liquid reaction medium in the reaction chamber.

5. A process according to claim 1 in which a liquid diluent other than the tetrahalide is introduced into the reaction chamber so as to provide a liquid reaction medium.

6. A process according to claim 5 in which the liquid diluent is a hydrocarbon.

7. A process according to claim 6 in which said hydrocarbon is selected from the group consisting of benzene, toluene and xylene.

8. A process according to claim 1 in which the interhalogen compound is such that $x$ is an odd number.

9. A process according to claim 1 in which the interhalogen compound is selected from the group consisting of iodine monochloride and iodine trichloride.

10. A process for the production of material containing aluminium chloride and lower chloride of titanium, comprising (1) introducing into a reaction vessel aluminium metal, an amount of liquid titanium tetrachloride which is in excess of the amount required to react with all the aluminium metal, and an interhalogen compound selected from the group consisting of iodine monochloride and iodine trichloride, these three reactants being intimately intermingled, (2) reacting the aluminium metal with the titanium tetrachloride in the presence of the interhalogen compound to produce aluminium chloride and lower chloride of titanium, and (3) recovering from the reaction vessel material containing aluminium chloride and lower chloride of titanium.

11. A process according to claim 10 in which there is also introducing into the reaction vessel to provide a liquid reaction medium therein a liquid hydrocarbon diluent.

12. A process according to claim 1 in which the liquid hydrocarbon diluent is selected from the group consisting of benzene, toluene and xylene.

13. A process according to claim 10 in which the weight of the interhalogen compound is from 0.9 to 10 times the weight of the aluminium.

14. A process according to claim 13 in which the weight of the interhalogen compound is from 1.5 to 4 times the weight of the aluminium.

15. A process according to claim 1 in which the reaction is effected in the absence of moisture.

16. A process according to claim 10 in which the reaction is effected in the absence of moisture.

(References on following page)

References Cited by the Examiner

UNITED STATES PATENTS

| | | | |
|---|---|---|---|
| 2,756,215 | 7/1956 | Burgess et al. | 252—372 |
| 2,760,938 | 8/1956 | Dempster et al. | 252—372 |
| 2,766,133 | 10/1956 | Marcot et al. | 106—300 |
| 2,790,704 | 4/1957 | Lewis | 106—300 |
| 2,798,819 | 7/1957 | Schaumann | 106—300 |
| 2,970,179 | 1/1961 | Glaze | 260—683.15 |
| 2,979,549 | 4/1961 | Thomas | 260—683.15 |
| 3,017,401 | 1/1962 | Bo et al. | |
| 3,031,440 | 4/1962 | Kaufman et al. | |
| 3,032,390 | 5/1962 | Gaunt | 23—51 |

OSCAR R. VERTIZ, *Primary Examiner.*

TOBIAS E. LEVOW, EDWARD STERN, *Examiners.*

J. POER, *Assistant Examiner.*